United States Patent
Cordovano

[11] Patent Number: 6,164,876
[45] Date of Patent: Dec. 26, 2000

[54] CUTTING TOOL

[75] Inventor: James S. Cordovano, Greenville, S.C.

[73] Assignee: Tungsten Industries, Inc, Travelers Rest, S.C.

[21] Appl. No.: 09/430,059

[22] Filed: Oct. 30, 1999

[51] Int. Cl.[7] .................................................. B23C 5/10
[52] U.S. Cl. .............................. 407/59; 407/60; 407/61; 407/63
[58] Field of Search .................................. 407/53, 55, 59, 407/60, 61, 62, 63

[56] References Cited

U.S. PATENT DOCUMENTS

| | | | |
|---|---|---|---|
| 3,058,199 | 10/1962 | Cave et al. | 407/54 |
| 3,456,316 | 7/1969 | Dawson | 407/53 |
| 3,736,634 | 6/1973 | Sonnie | 407/54 |
| 3,775,819 | 12/1973 | Ribich | 407/53 |
| 4,227,837 | 10/1980 | Yodoshi | 407/53 |
| 4,395,167 | 7/1983 | Maternus | 407/54 |
| 4,475,850 | 10/1984 | Penoza et al. | 407/54 |
| 4,497,600 | 2/1985 | Kishimoto | 407/53 |
| 4,507,028 | 3/1985 | Matsushita | 408/230 |
| 4,721,421 | 1/1988 | Klinger | 407/63 |
| 4,770,567 | 9/1988 | Moriarty | 407/59 |
| 4,810,136 | 3/1989 | Paige | 407/54 |
| 4,967,855 | 11/1990 | Moser | 175/394 |
| 5,188,488 | 2/1993 | Nakayama et al. | 407/54 |
| 5,193,944 | 3/1993 | Nishimura | 407/53 |
| 5,221,163 | 6/1993 | Nishimura | 407/53 |
| 5,323,823 | 6/1994 | Kopras | 144/219 |
| 5,641,028 | 6/1997 | Resendez et al. | 175/323 |

FOREIGN PATENT DOCUMENTS

| | | |
|---|---|---|
| 0329624A2 | 8/1989 | European Pat. Off. . |
| 0913222A1 | 5/1999 | European Pat. Off. . |
| 2649341 | 1/1991 | France . |
| 937649 | 1/1956 | Germany ................................. 407/53 |
| 3243522A1 | 5/1984 | Germany . |
| 3742-942 | 12/1988 | Germany ................................. 407/42 |
| 55-924847 | 2/1980 | Japan ..................................... 407/53 |
| 1-127214 | 5/1989 | Japan ..................................... 407/53 |

*Primary Examiner*—A. L. Wellington
*Assistant Examiner*—Erica Ergenbright
*Attorney, Agent, or Firm*—Hardaway/Mann IP Group

[57] ABSTRACT

A cutting tool having a body that is cylindrical in shape having a shank at one end and a cutting end opposite thereof. The cutting end has an even number of flutes thereon with every other flute being a cutting flute, such as a knuckle flute including a radial knuckle flute and a flat crested knuckle flute, or a diamond cut flute that cuts material. Every other flute therebetween the cutting flutes are wiper flutes that wipe or clean the cut material. The wiper flutes have a larger diameter than the cutting flutes thereby enabling the wiper flutes to remove any unnecessary debris and finish the material in a single step.

2 Claims, 4 Drawing Sheets

CUTTING TOOL

BACKGROUND OF THE INVENTION

1. Field of Invention

The present invention relates to a cutting tool for cutting a variety of materials and more particularly for a router or end mill that will remove debris while cutting various materials and clean the cut surface in a single step process.

2. Description of Prior Art

When cutting solid materials with a router or end mill, debris is created due to the cutting action of the cutting tool against the solid material. The debris that is created can clog the cutting tool and slow down the cutting process and leave an unfinished material. A way of both cutting the material and finishing it with relative ease and economy is an issue of concern. The current method of using a router or end mill to cut the material followed by another router or end mill along the same cutting path to finish the material is time and energy consuming as well as expensive because two separate cutting tools are needed.

Cutting tools, such as router or end mills, that are common in the art currently only have one type of cutting or roughing flute such as a knuckle flute, a flat crested flute or a diamond cut flute. The standard proceedure for routing or milling is to employ a roughing cut followed by a finishing cut if the roughing cut has not produced a satisfactory finish. Some examples of cutting tools with flutes directed to a single type (cutting only, no cleaning) are found in U.S. Pat. No. 4,395,167 for a "Router Especially For Use As A Fiber-Metal Cutter" issued to Maternus, U.S. Pat. Nos. 5,193,944 and 5,221,163 both for a "Nicked Cutting Tool" to Nishimura, U.S. Pat. No. 4,810,136 for a "Milling Cutter for Composite Laminates" to Paige and U.S. Pat. No. 3,058,199 for a "Cutting Tool" to Cave et al.

Standard in the art are cutting tools with consistent diameters at both the shank end and the cutting end. That is, the body of the cutting tool is cylindrical in shape and the diameter of the cutting tool at the shank end is equal to the diameter of the cutting tool at the cutting end. However, it is possible to change the diameter of the cutting tool, for example, taper the cutting end to a smaller diameter than at the shank end. This tapered shape is used in conjunction with flutes all of the same type, i.e. all knuckle flutes, and is also known in the art. Therefore, a variation of the cutting tool with only cutting type flutes, as previously described, is found in the U.S. Pat. No. 5,188,488 for an "End Mill" to Nakayama et al. wherein the overall shape of the body of the cutting tool tapers at the cutting end. This device is used for cutting purposes and not finishing purposes. If this tool is used, a finishing tool is also needed to finish the cut material.

There are also cutting tools that combine cutting flutes with reamer flutes such as found in U.S. Pat. No. 4,507,028 for a "Combined Drill and Reamer" issued to Matsushita. However, in the Matsushita patent, the cutting flutes are located at the cutting end of the cutting tool and then the reamer flutes are adjacent thereto or further along on the body of the cutting tool. The two different types of flutes, cutting and reamer, do not exist in a side-by-side fashion where both are used simultaneously and both extend the same length down the cutting tool. Also, a finishing tool is still needed for finishing work when this device is used While the above stated devices are a fair representation of the current prior art, there remains room for improvement as defined by the currently claimed invention.

SUMMARY OF THE INVENTION

An objective of the present invention is to provide a cutting tool that can cut and finish a variety of materials in a single step process.

Another object of the present invention is to provide a cutting tool having a plurality of flutes wherein every other flute has a wider diameter than the flutes on either side thereof and the flutes with the smaller diameter cut the surface while the flutes with the larger diameter clean the material surface.

The aforementioned objectives will be accomplished as well as other features and advantages of the present invention will become more apparent from the following detailed description of the cutting tool having a body with a plurality of flutes wherein every other flute is a cutting flute and every other flute therebetween is a wiper flute wherein the wiper flutes have a larger diameter than the cutting flutes so that the wiper flutes can clean the material after it has been cut and such cutting and cleaning is carried out in a single step process. The description of the present invention discloses, in conjunction with the drawings which illustrate by way of example, the principles and objects of the invention.

DETAILED DESCRIPTION OF THE INVENTION

Figure 1:
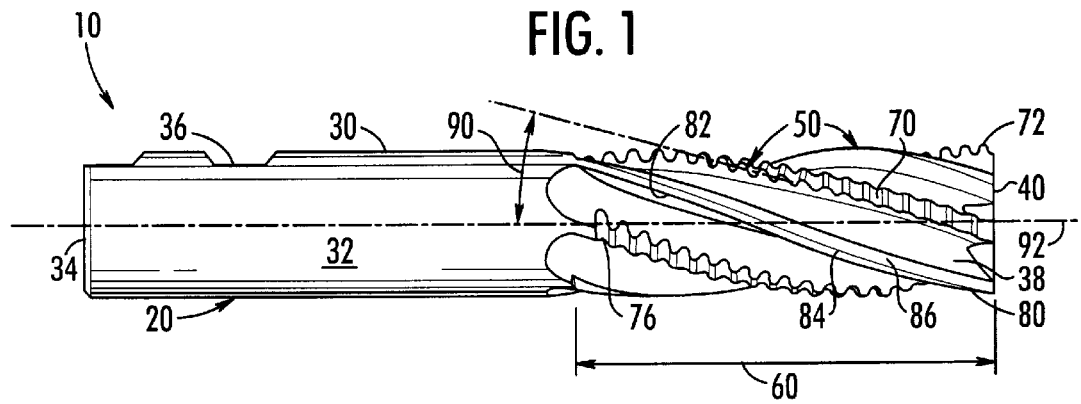
FIG. 1 is a side elevation view of the first embodiment of a cutting tool.

FIG. 1 is an elevation view of the first embodiment of a cutting tool 10. The first embodiment of the cutting tool 10 is directed to an end mill 20. The cutting tool 10 has a body 30 with a shank 32 at one end and a cutting end 38 opposite thereof. The body 30 is a rod or bar that is cylindrical in shape and is made of a tungsten carbide material.

The shank 32 has a shank chamfer 34 around the perimeter end of the cutting tool 10. Optionally, a notch 36 may be inset into one side of the shank 32 end of the cutting tool 10 and is used for fitting the cutting tool 10 within a socket or the like.

The cutting end 38 is used to cut various types of materials such as, but not limited to circuit boards, KEVLAR, carbon epoxy, graphite, fiberglass, aluminum, copper, brass and other materials. The cutting end 38 is comprised of a plurality of flutes 50 extending from the tip 40 toward the middle of the body 30 a specified flute length 60. All of the flutes 50 are the same flute length 60 regardless of what type of flute 50 they are.

There are two types of flutes 50 on the first embodiment of the end mill 20: knuckle flutes 70 and wiper flutes 80. The knuckle flutes 70, in this embodiment are radial knuckle flutes however any conventional knuckle flute 70 may be used, including but not limited to radial, flat crested and pointed knuckles. The knuckle flutes 70 are used to cut the material and the wiper flutes 80 are used to finish the material so it does not have any debris, burrs or rough edges. The combination of the two types of flutes 50 within a single cutting tool 10 is important because it reduces what was previously a two step cutting and then finishing process in the art to a single cut-and-finish process. This is advantageous not only economically, because there is now only one cutting tool 10 needed instead of two, but also because the overall time to complete a project is reduced as well as the amount of energy and effort that goes into completing the process of cutting and finishing a material. Each knuckle flute 70 is comprised of a series of radius knuckles 72 extending the entire length of the knuckle flute 70. The size and lead of the radius knuckles 72 may vary depending upon desirability and purpose. Each knuckle flute 70 has a cutting edge 76 that is used to cut the material when the cutting tool 10 is in use. The cutting tool 10 is rotated at a particular speed, which may be varied, and with each rotation the cutting edge 76 contacts the material being cut, shearing it as the cutting tool 10 is advanced through the material.

Figure 2:
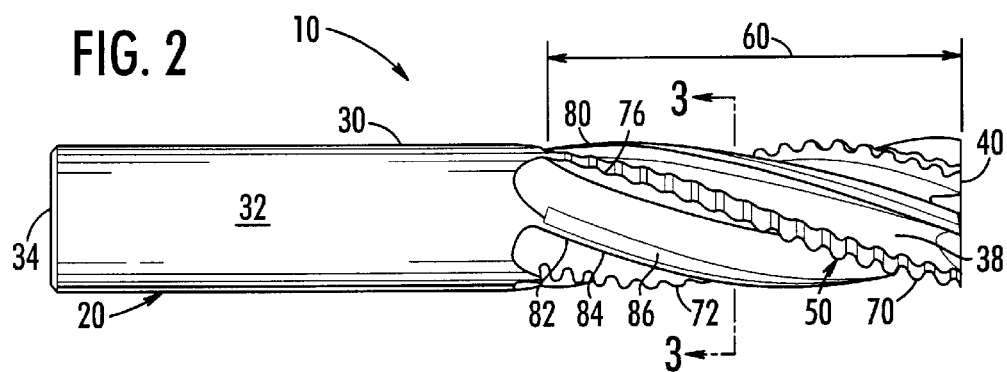
FIG. 2 is a side elevation view of the first embodiment of a cutting tool with the cutting tool rotated 90 degrees from that shown in FIG. 1.

In the preferred embodiment as shown in side elevation view of FIG. 2, each cutting tool 10 has a plurality of flutes 50, usually an even number with an equal number of knuckle flutes 70 and wiper flutes 80. However, it may be possible to have an odd number of flutes 50 and an unequal number of knuckle flutes 70 and wiper flutes 80. The knuckle flutes 70 are offset with the wiper flutes 80 around the circumference of the cutting tool 10. That is, every other flute 50 is a knuckle flute 70 and every other flute 50 therebetween is a wiper flute 80. The combination and orientation of having a knuckle flute 70 followed by a wiper flute 80 followed by a knuckle flute 70 and so on as the cutting tool 10 rotates provides a cutting action by the cutting edge 76 of the knuckle flute 70 followed by a cleaning action by the cutting edge 82 of the wiper flute which is then repeated by the next flutes 50.

Each wiper flute 80 is comprised of a plurality of relief surfaces. The relief surface extending along the length of the cutting tool 10 is the radial relief and the relief across the end of the tip of the cutting tool 10 is the axial relief. The radial relief has a first surface that is a primary relief 84 and the second surface that is a secondary relief 86. The relationship of the primary relief 84 and the secondary relief 86 allow for the cut material to pass over the wiper flute 80 with relative ease and not get hung up or stuck thereon, creating problems with the efficiency of the cutting tool 10 and slowing it down. The surface of the primary relief 84 is at a slightly different angle than that of the secondary relief 86, thus diminishing the amount of resistance the cut material has to overcome when the cutting tool 10 is in use.

Figure 3:
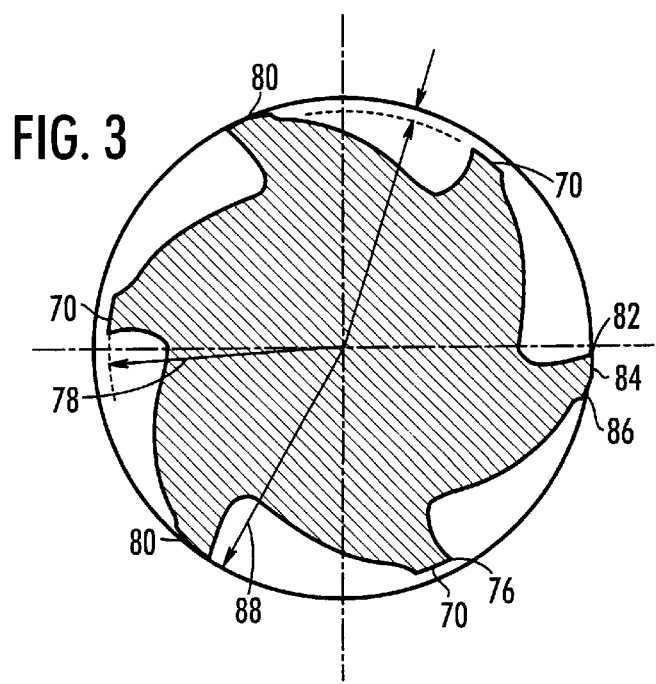
FIG. 3 is a cross-sectional view taken along line 3—3 in FIG. 2 of the first embodiment of the cutting tool.

FIG. 3 is a cross-sectional view of the cutting tool 10. The knuckle flute 70 has a knuckle flute diameter 78 and the wiper flute 80 has a wiper flute diameter 88. The knuckle flute diameter 78 is slightly smaller than the wiper flute diameter 88. The preferred embodiment has a knuckle flute diameter of 0.001" to 0.002" less than that of the wiper flute diameter 88. However, the specific amount of such a difference may vary with the overall size and shape of the cutting tool 10. This difference in diameters 78,88 ensures that the wiper flutes 80 is extended out from the axial or center line 92 of the cutting tool 10 a little further than the knuckle flutes 70 and as such will clean off any material left by the knuckle flutes 70, thus having a cleaning effect. For example, the knuckle flute 70 cuts the bulk of the material and then the wiper flute 80 cleans off any remaining material such as debris, burrs and slivers that remain after the knuckle flute 70 has rotated through the material. This follow-up action by the wiper flute 80 finishes the material in the same process by the same tool as is used to cut the material with the knuckle flutes 70. This single action, multi-function process eliminates the need for a second pass along the material with a second cutting tool 10 comprised solely of wiper flutes 80.

Both the knuckle flutes 70 and the wiper flutes 80 extend in a helix fashion around the cutting tool 10. The helix angle may be varied and is the same for both the knuckle flutes 70 and the wiper flutes 80. Therefore the knuckle flutes 70 parallel the wiper flutes 80 around the body 30.

The tip 40 of the cutting tool 10 can be of any conventional type known in the art such as square ends, center cut ends and ball ends, but is not limited thereto.

Figure 4:
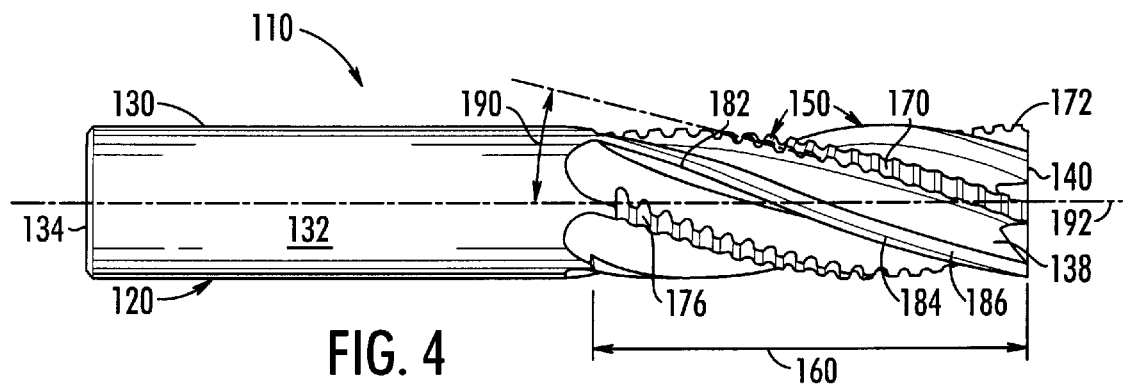
FIG. 4 is a side elevation view of the second embodiment of a cutting tool.

FIG. 4 is an elevation view of the second embodiment of a cutting tool 110. The second embodiment of the cutting tool 110 is also directed to an end mill 120. This embodiment of the cutting tool 110 has a body 130 with a shank 132 at one end and a cutting end 138 opposite thereof. The body 130 is a rod or bar that is cylindrical in shape and is made of a tungsten carbide material.

The shank 132 has a shank chamfer 134 around the perimeter end of the cutting tool 10 and may or may not have a notch inset into one side of the shank 132 end of the cutting tool 110 and is used for fitting the cutting tool 110 within a socket or the like.

The cutting end 138 is used to cut various types of materials and is comprised of a plurality of flutes 150 extending from the tip 140 toward the middle of the body 130 a distance of a flute length 160. All of the flutes 150 are of equal flute length 160.

The second embodiment of the cutting tool 110 has two types of flutes 150: flat crested flutes 170 and wiper flutes 180. The flat crested flutes 170 are used to cut the material and the wiper flutes 180 are used to finish the cut material. As with the first embodiment, the combination of the two types of flutes 150 within a single cutting tool 110 is important because it reduces what was previously a two step cutting process and then a finishing process in the art, to a single cut-and-finish process, thus reducing tools, time, effort and energy associated with the overall process.

Each flat crested flute 170 is comprised of a series of flat crests 172 extending the entire length of the flat crested flute 170. The size and shape of the flat crests 172 may vary depending upon desirability and purpose and are standard in the industry. Each flat crest 170 has a cutting edge 176 that is used to cut the material. As the cutting tool 110 is rotated, the cutting edge 176 contacts the material being cut, shearing it as the cutting tool 110 is advanced through the material.

Figure 5:
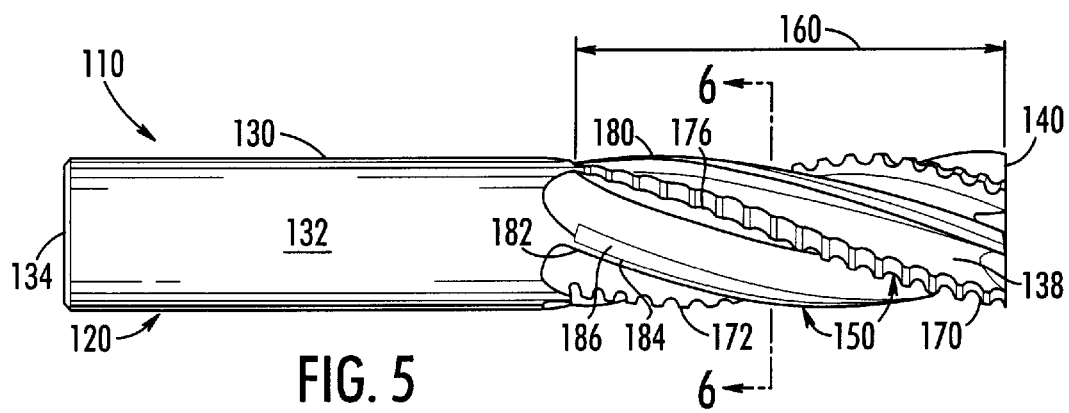
FIG. 5 is a side elevation view of the second embodiment of a cutting tool with the cutting tool rotated 90 degrees from that shown in FIG. 4.
Figure 6:
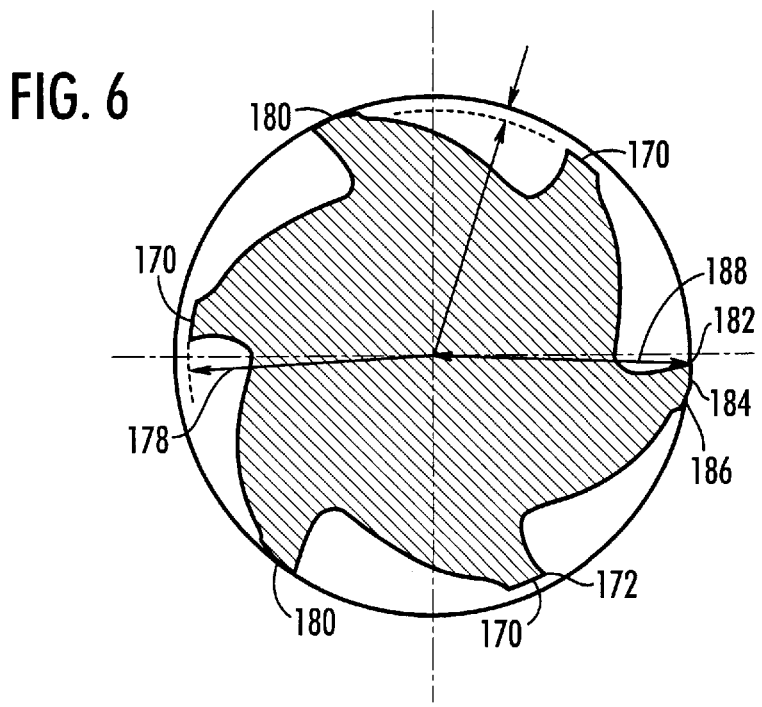
FIG. 6 is a cross-sectional view taken along line 6—6 in FIG. 5 of the second embodiment of the cutting tool.

FIG. 5 is a side elevation view of the second embodiment of the cutting tool 110. Each cutting tool 110 has a plurality of flutes 150, usually an even number with an equal number of flat crested flutes 170 and wiper flutes 180. If desired, it may be possible to have an odd number of flutes 150 and an unequal number of flat crested flutes 170 and wiper flutes 180 may be used. The flat crested flutes 170 are offset with the wiper flutes 180 around the circumference of the cutting tool 110. That is, every other flute 150 is a flat crested flute 170 and every other flute 150 therebetween is a wiper flute 180. The combination and orientation of having a knuckle flute 170 followed by a wiper flute 180 followed by a flat crested flute 170 and so on as the cutting tool 110 rotates provides a cutting action by the cutting edge 176 of the flat crested flute 170 followed by a cleaning action by the cutting edge 182 of the wiper flute which is then repeated by the next flutes 150.

Each wiper flute 180 is comprised of at least two top or outer surfaces. The first surface is a primary relief 184 and the second surface is a secondary relief 186. The relationship of the primary relief 184 and the secondary relief 186 allow for the cut material to pass over the wiper flute 184 with relative ease and not get hung up or stuck thereon, creating problems with the efficiency of the cutting tool 110 and slowing it down. The surface of the primary relief 184 is at a slightly different angle than that of the secondary relief 186, thus diminishing the amount of resistance the cut material has to overcome when the cutting tool 110 is in use.

As shown in the cross-sectional view of FIG. 3, the flat crested flute 170 has a knuckle flute diameter 178 and the wiper flute 180 has a wiper flute diameter 188. The flat crested flute diameter 178 is slightly smaller than the wiper flute diameter 188. The wider wiper flute diameter 188 ensure that the wiper flutes 180 extend out from the axial or center line 192 of the cutting tool 110 a greater distance than the flat crested flutes 170 and as such will clean off any material left by the flat crested flutes 170, thus having a cleaning effect. The cut and finish process is comprised of using a body 30 of the cutting tool 10 in a rotating manner. As the cutting tool 10 rotates, the flat crested flute 170 cuts the bulk of the material and the wiper flute 180 cleans off any remaining material such as burrs and slivers that remain after the flat crested flute 170 has rotated through the material. This follow-up action by the wiper flute 180 finishes the material in the same process as that which cuts the material, eliminating the need for any additional tool or follow-up finishing.

The flat crested flutes 170 and the wiper flutes 180 extend in a helix at a helix angle 190 around the cutting tool 110. The helix angle 190 may be varied and is the same for both the flat crested flutes 170 and the wiper flutes 180, thus providing for a parallel relationship among the two types of flutes 160.

The tip 140 of the cutting tool 110 can be of any conventional type known in the art such as square ends, center cut ends and ball ends, but not limited thereto.

Figure 7:
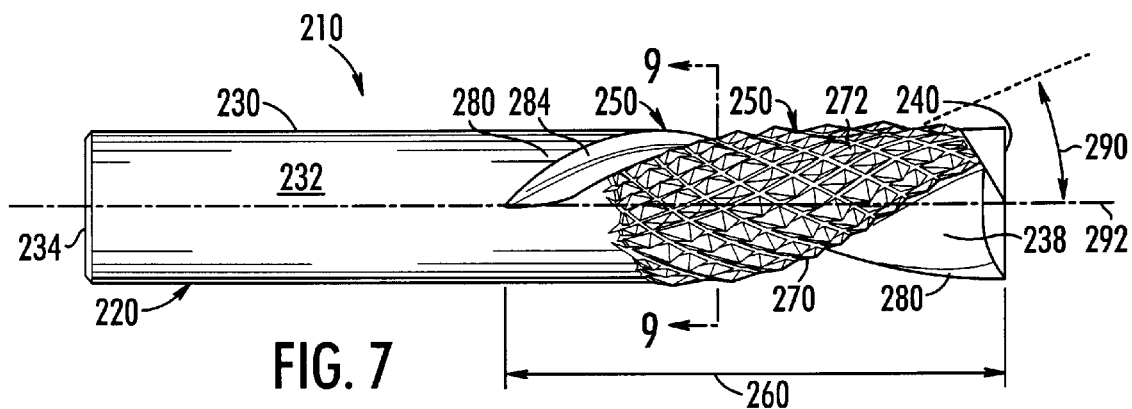
FIG. 7 is a side elevation view of the third embodiment of a cutting tool.
Figure 8:
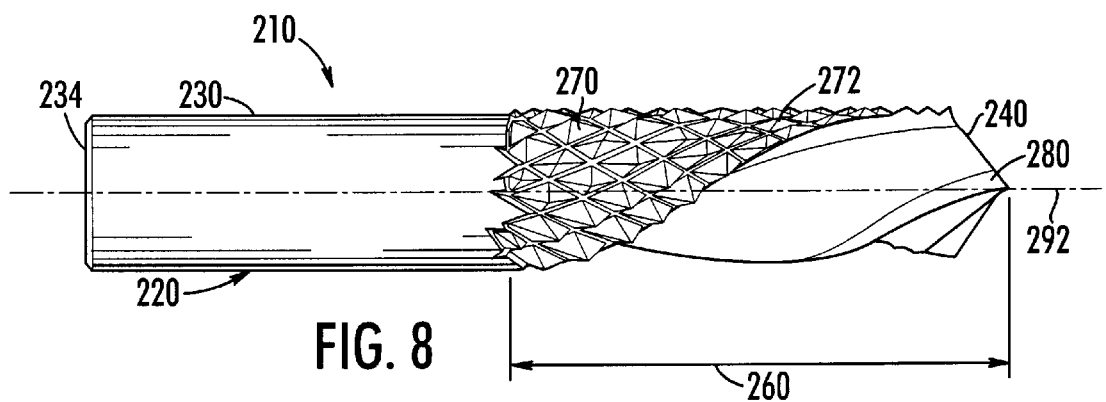
FIG. 8 is a side elevation view of the third embodiment of a cutting tool with the cutting tool rotated 180 degrees from that shown in FIG. 7.
Figure 9:
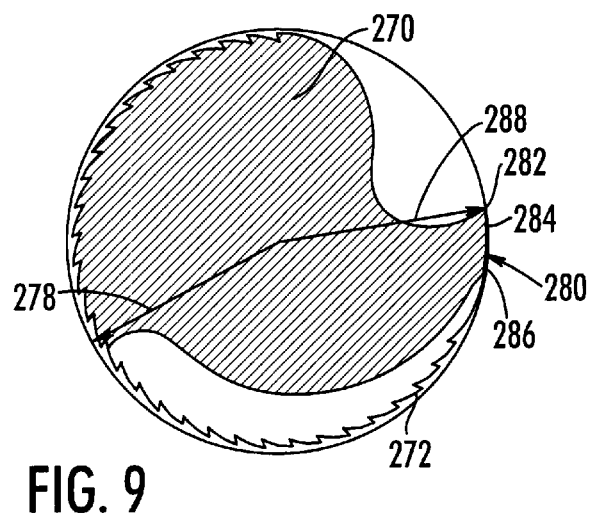
FIG. 9 is a cross-sectional view taken along line 9—9 in FIG. 7 of the third embodiment of the cutting tool.

FIG. 7 is an elevation view of the third embodiment of a cutting tool 210. The third embodiment of the cutting tool 210 is for a router 220. The cutting tool 210 of this embodiment has a body 230 with a shank 232 at one end and a cutting end 238 opposite thereof. The body 230 is a rod or bar that is cylindrical in shape and is made of a tungsten carbide material.

The shank 232 has a shank chamfer 234 around the perimeter end of the cutting tool 210 and a notch may be inset into one side of the shank 232 end of the cutting tool 210 for fitting the cutting tool 210 within a socket or similar article.

The cutting end 238 is used to cut material and has a plurality of flutes 250 extending from the tip 240 in to the middle of the body 230 a specified flute length 260. The flute lengths are equal for all of the flutes.

This embodiment of the cutting tool 210 has both at least one diamond cut flute 270 and at least one wiper flute 280. A plurality of both types of flutes 250 may be possible, but the preferred embodiment only has a single diamond cut flute 270 and a single wiper flute 280. The diamond cut flute 270 is used to cut the material and the wiper flute 280 is used to finish the material removing any unnecessary burrs or rough edges. As with previous embodiments, the combination of the two types of flutes 250 within a single cutting tool 210 reduces a two-step cutting then finishing process in the art to a single cut-and-finish process.

Each diamond cut flute 270 is comprised of a series of teeth 272 extending the entire length of the diamond cut flute 270, each tooth being diamond or pyramid shaped, and if so desired they can be pyramid shaped with a flat top thereon known in the art as a DIAMO cut. The size and shape of the teeth 272 may vary depending upon desirability and purpose. Each diamond cut flute 270 has multiple cutting edges 276 that are used to cut the material when the cutting tool 210 is in use. The cutting tool 210 is rotated at a particular speed, which may be varied, and with each rotation the cutting edge 276 contacts the material being cut, cutting the material as the cutting tool 210 is advanced through the material.

The side elevation view of the third embodiment of the cutting tool 210 discloses at least one diamond cut flute 270 and at least one wiper flute 280. More flutes 250 of both types may be used and equal numbers of each type would help ensure a balanced cutting tool, however uneven numbers are foreseeable. In the preferred embodiment, there is only one diamond cut flute 270 and one wiper flute 280. If more flutes are desired, then the diamond cut flutes 270 would need to be offset from the wiper flutes 280 around the circumference of the cutting tool 210 with every other flute 250 being a diamond cut flute 270 and every other flute 250 therebetween being a wiper flute 280. The combination and orientation of having a diamond cut flute 270 followed by a wiper flute 280 as the cutting tool 210 rotates provides a cutting action by the cutting edges 276 of the diamond cut 270 followed by a cleaning or finishing action by the cutting edge 282 of the wiper flute 280.

Each wiper flute 280 is comprised of a plurality of top or outer surfaces. The first surface is a primary relief 284 and the second surface is a secondary relief 286. The relationship of the primary relief 284 and the secondary relief 286 is to smooth out the surface of the wiper flute 280 so that cut material may pass over the wiper flute 280 with relative ease and not get hung up or stuck thereon, creating problems with the efficiency of the cutting tool 210. The surface of the primary relief 284 is at a slightly different angle than that of the secondary relief 286, thus diminishing the amount of resistance the cut material has to overcome when the cutting tool 210 is in use.

The diamond cut flute 270 has a diamond cut flute diameter 278 and the wiper flute 280 has a wiper flute diameter 288. The wiper flute diameter 288 is slightly larger than the diamond cut flute diameter 278. The difference in the diameters ensures that the wiper flute 280 extends out from the axial or center line 292 of the cutting tool 210 a little further than the diamond cut flute 270 and as such will clean off any material left by the diamond cut flute 270. In use, the body 230 of the cutting tool 210 is rotated. As the body 230 rotates, the diamond cut flute 270 cuts the bulk of the material leaving rough edges. Then the wiper flute 280 cleans off any remaining material such as the rough edges, burrs and slivers that remain after the knuckle flute 270 has rotated through the material. This follow-up action by the wiper flute 280 finishes the material in the same process as it is cut by the diamond cut flute 270, thus eliminating the need for a second pass along the material with a second cutting tool 210 comprised solely of wiper flutes 280.

Both the diamond cut flute 270 and the wiper flute 280 extend in a helix fashion around the cutting tool 210. The helix angle 290 may be varied and is the same for both the diamond cut flute 270 and the wiper flute 280.

The tip 240 of the cutting tool 210 can be of any conventional type known in the art.

Figure 10:
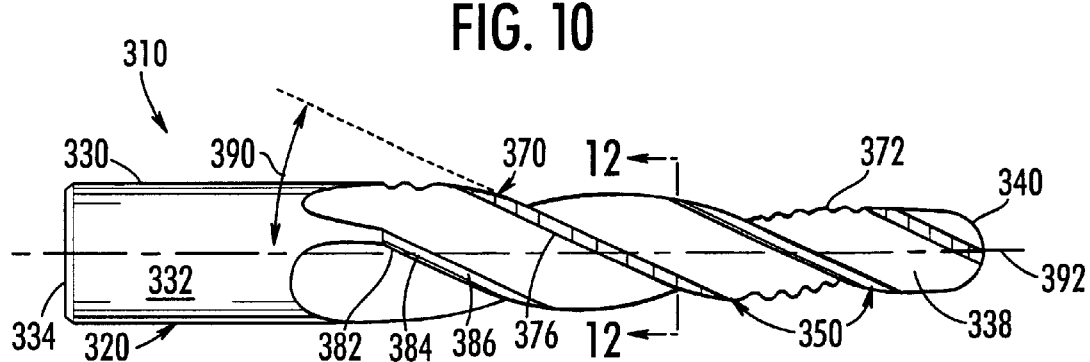
FIG. 10 is a side elevation view of the fourth embodiment of a cutting tool.

FIG. 10 is an elevation view of the fourth embodiment of a cutting tool 310. The fourth embodiment of the cutting tool 310 is directed to an end mill 320. The cutting tool 310 has a body 330 with a shank 332 at one end and a cutting end 338 opposite thereof. The body 330 is a rod or bar that is cylindrical in shape, tapered at one end and is made of a tungsten carbide material.

The shank 332 has a shank chamfer 334 around the perimeter end of the cutting tool 310. As with previous embodiments, a notch may optionally be inset into one side of the shank 332 end of the cutting tool 310.

The cutting end 338 is used to cut various types of materials and is comprised of a plurality of flutes 350 extending from the tip 340 and extending toward the middle of the body 330 a specified distance known as the flute length 360. The flute lengths 360 are equal for all of the flutes 350.

This particular embodiment of the cutting tool 310 has knuckle flutes 370 and wiper flutes 380. The knuckle flutes 370 are used to cut the material and the wiper flutes 380 are used to finish the material so it does not have any burrs or rough edges as identified in previous embodiments. The combination of the two types of flutes 350 within a single cutting tool 310 reduces what was previously a two step cutting then finishing process in the art to a single cut-and-finish process. The tapered nature of the body 330 also allows for cuts to be made in material leaving an angled edge surface.

Each knuckle flute 370 is comprised of a series of radius knuckles 372 extending the entire length of the knuckle flute 370. The size and lead of the radius knuckles 372 may vary depending upon desirability and purpose. Each knuckle flute 370 has a cutting edge 376 that is used to cut the material when the cutting tool 310 is in use. The cutting tool 310 is rotated at a particular speed, which may be varied, and with each rotation the cutting edge 376 contacts the material being cut, shearing it as the cutting tool 310 is advanced through the material.

Figure 11:
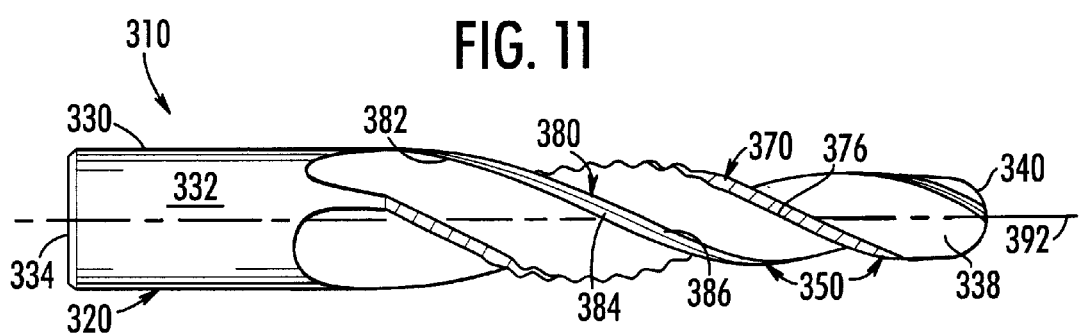
FIG. 11 is a side elevation view of the fourth embodiment of a cutting tool with the cutting tool rotated 90 degrees from that shown in FIG. 10.

In the preferred embodiment as shown in the side elevation view of FIG. 11, each cutting tool 310 has a plurality of flutes 350, usually an even number with an equal number of knuckle flutes 370 and wiper flutes 380. Again, it may be possible to have an odd number of flutes 350 and an unequal number of knuckle flutes 370 and wiper flutes 380. The knuckle flutes 370 are offset with the wiper flutes 380 around the circumference of the cutting tool 310. Every other flute 350 is a knuckle flute 370 and is a wiper flute 380 therebetween. The combination and orientation of having a knuckle flute 370 followed by a wiper flute 380 followed by a knuckle flute 370 and so on as the cutting tool 310 rotates provides a cutting action by the cutting edge 376 of the knuckle flute 370 followed by a cleaning action by the cutting edge 382 of the wiper flute which is then repeated by the next flutes 350.

Each wiper flute 380 is comprised of at least two top or outer surfaces. The first surface is a primary relief 384 and the second surface is a secondary relief 386. The relationship of the primary relief 384 and the secondary relief 386 allow for the cut material to pass over the wiper flute 384 with relative ease and not get hung up or stuck thereon, creating problems with the efficiency of the cutting tool 310 and slowing it down. The surface of the primary relief 384 is at a slightly different angle than that of the secondary relief 386, thus diminishing the amount of resistance the cut material has to overcome when the cutting tool 310 is in use.

Figure 12:
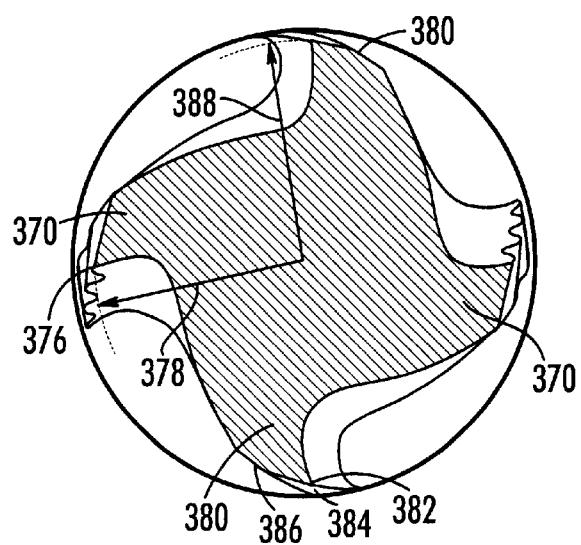
FIG. 12 is a cross-sectional view taken along line 12—12 in FIG. 10 of the fourth embodiment of the cutting tool.

FIG. 12 is a cross-sectional view of the cutting tool 310 disclosing the knuckle flute 370 and its knuckle flute diameter 378 as well as the wiper flute 380 and its wiper flute diameter 388. The knuckle flute diameter 378 is slightly smaller than the wiper flute diameter 388. This ensures that the wiper flutes 380 is extended out from the axial or center line 392 of the cutting tool 310 a little further than the knuckle flutes 370 and as such will clean off any material left by the knuckle flutes 370, thus having a cleaning effect. For example, the knuckle flute 370 cuts the bulk of the material leaving rough edges. Then the wiper flute 380 cleans off any remaining material such as the rough edges, burrs and slivers that remain after the knuckle flute 370 has rotated through the material. This follow-up action by the wiper flute 380 finishes the material in the same process as it is cut by the knuckle flutes 370, thus eliminating the need for a second pass along the material with a second cutting tool 310 comprised solely of wiper flutes 380.

Both the knuckle flutes 370 and the wiper flutes 380 extend in a helix fashion around the cutting tool 310. The helix angle 390 may be varied and is the same for both the knuckle flutes 370 and the wiper flutes 380.

The tip 340 of the cutting tool 310 can be of any conventional type known in the art such as square ends, center cut ends and ball ends, but not limited thereto.

The cutting tool 10 described herein and illustrated in the drawings is subject to other advantages and modifications that may be apparent to those of ordinary skill in the art without departing from the spirit and scope of the appended claims. Accordingly, the invention is to be limited only by the scope of the following claims and their equivalents.

What is claimed is:

1. A cutting tool comprising:

a cylindrical body (30) having a shank(32) and a cutting end (38), said cutting end including six parallel helical flutes (70, 80), said flutes being equally spaced from one another by helical grooves, three of said flutes being cutting flutes (70) with cutting knuckles and three of said flutes being cleaning flutes (80), said cleaning flutes (80) having a first diameter and said cutting flutes (70) having a second diameter, said first diameter is least 0.001 of an inch greater than said second diameter, said cleaning flutes (80) being positioned between said cutting flutes (70) in alternating fashion and serving to clean away material cut by said cutting flutes (70).

2. The cutting tool of claim 1 wherein said cleaning flutes (80) include a wiping edge having primary relief (84) and a secondary relief (86).

* * * * *